(12) United States Patent
Landers et al.

(10) Patent No.: US 8,047,012 B2
(45) Date of Patent: Nov. 1, 2011

(54) REFRIGERATION SYSTEM AND METHOD USING MULTIPLE VARIABLE CAPACITY DEVICES

(75) Inventors: Daniel Landers, Woodstock, GA (US); Gregory Mickelson, Acworth, GA (US)

(73) Assignee: Computer Process Controls, Inc., Kennesaw, GA (US)

( * ) Notice: Subject to any disclaimer, the term of this patent is extended or adjusted under 35 U.S.C. 154(b) by 457 days.

(21) Appl. No.: 12/125,754

(22) Filed: May 22, 2008

(65) Prior Publication Data

US 2008/0289349 A1 Nov. 27, 2008

Related U.S. Application Data

(60) Provisional application No. 60/931,681, filed on May 24, 2007.

(51) Int. Cl.
*F25B 49/00* (2006.01)
(52) U.S. Cl. .......................................... 62/228.5; 62/510
(58) Field of Classification Search ..................... 62/175, 62/228.1, 228.4, 228.5, 510; 417/2, 3
See application file for complete search history.

(56) References Cited

U.S. PATENT DOCUMENTS

| | | | |
|---|---|---|---|
| 4,563,624 A | 1/1986 | Yu | |
| 4,663,725 A | 5/1987 | Truckenbrod et al. | |
| 5,791,155 A | 8/1998 | Tulpule | |
| 6,213,731 B1 | 4/2001 | Doepker et al. | |
| 6,821,092 B1 | 11/2004 | Gehret et al. | |
| 7,617,695 B2 * | 11/2009 | Shapiro | 62/228.5 |
| 7,814,758 B2 | 10/2010 | Landers et al. | |
| 2003/0230098 A1 | 12/2003 | Moon et al. | |
| 2007/0240436 A1 * | 10/2007 | Landers et al. | 62/157 |

FOREIGN PATENT DOCUMENTS

| | | |
|---|---|---|
| JP | 02183770 A | 7/1990 |
| JP | 03172587 | 7/1991 |
| JP | 10307759 A | 11/1998 |
| KR | 20050112802 | 12/2005 |
| KR | 20060070914 | 6/2006 |
| WO | 2008147532 A1 | 12/2008 |

OTHER PUBLICATIONS

International Preliminary Report on Patentability dated Nov. 24, 2009 regarding International Application No. PCT/US2008/006603.
Written Opinion of the International Searching Authority for International application No. PCT/US2008/006603 dated Sep. 29, 2008.
International Search Report for International application No. PCT/US2008/006603 dated Sep. 29, 2008.
State Intellectual Property Office of People's Republic of China Notification of the First Office Action regarding Chinese Application No. 200880001323.5, dated Aug. 30, 2010. Translation provided by Unitalen Attorneys at Law.
Extended European Search Report regarding European Patent Application No. 08754688.3, dated Jun. 10, 2010.

(Continued)

*Primary Examiner* — Marc E Norman
(74) *Attorney, Agent, or Firm* — Harness, Dickey & Pierce, P.L.C.

(57) ABSTRACT

A system and method of controlling a compressor rack having a plurality of variable capacity components is provided. A variable capacity component is selected from the plurality of variable capacity components as a designated variable capacity component. The designated variable capacity component is operated by varying a capacity of the designated variable capacity component. Each variable capacity component of the plurality of variable capacity components, except for the designated variable capacity component, is operated at a fixed capacity corresponding to one of a maximum and a minimum capacity of the variable capacity component.

18 Claims, 9 Drawing Sheets

OTHER PUBLICATIONS

Response to communication dated Jun. 29, 2010 from the European Patent Office regarding European Patent Application No. 08754688.3, dated Jan. 7, 2011.
International Search Report and the Written Opinion of the International Searching Authority regarding PCT/US2007/008060, dated Sep. 21, 2007.

Notice of Allowance and Fee(s) Due and Notice of Allowability regarding U.S. Appl. No. 11/732,120, dated Jun. 11, 2010.

Examiner's First Report on Australian Patent Application No. 2008257425, dated Mar. 11, 2011.

* cited by examiner

REFRIGERATION SYSTEM AND METHOD USING MULTIPLE VARIABLE CAPACITY DEVICES

CROSS-REFERENCE TO RELATED APPLICATIONS

This application claims the benefit of U.S. Provisional Application No. 60/931,681, filed on May 24, 2007. The disclosure of the above application is incorporated herein by reference.

FIELD

The present disclosure relates to refrigeration system control.

BACKGROUND

The statements in this section merely provide background information related to the present disclosure and may not constitute prior art.

A refrigeration system may include one or more compressors that compress refrigerant vapor. Refrigerant vapor from the compressors may be directed into a condenser coil where the vapor may be liquefied at high pressure. The high pressure liquid refrigerant may flow to an evaporator located in a refrigeration case after it is expanded by an expansion valve to a low pressure two-phase refrigerant. As the low pressure two-phase refrigerant flows through the evaporator, the refrigerant may absorb heat from the refrigeration case and boil off to a single phase low pressure vapor that may return to the compressors. The closed loop refrigeration process may then repeat.

The refrigeration system may include multiple compressors connected to multiple circuits. Each circuit may be a physically plumbed series of cases operating at similar pressures and temperatures. For example, in a grocery store, one set of cases within a circuit may be used for frozen food, while other sets may be used for meats or dairy.

The multiple compressors may be piped together in parallel using suction and discharge gas headers to form a compressor rack. The compressors may include scroll compressors, reciprocating compressors, and/or other suitable compressors. When multiple compressors are piped together in a compressor rack, an optimal control strategy is needed to activate and deactivate the compressors.

SUMMARY

A method of controlling a compressor rack having a plurality of variable capacity components is provided. The method includes selecting a variable capacity component from the plurality of variable capacity components as a designated variable capacity component and operating the designated variable capacity component by varying a capacity of the designated variable capacity component. The method also includes operating each variable capacity component of the plurality of variable capacity components, except for the designated variable capacity component, at a fixed capacity corresponding to one of a maximum and a minimum capacity of each variable capacity component.

In other features, the method also includes determining a desired rate of change of a compressor rack operating parameter and selecting the variable capacity component by comparing the desired rate of change with a variable capacity range for each variable capacity component and selecting the variable capacity component having a largest variable capacity range, that meets the desired rate of change, as the designated variable capacity component.

In other features, the method also includes determining a desired rate of change of a compressor rack operating parameter and selecting the variable capacity component by comparing the desired rate of change with a variable capacity range for each variable capacity component, ranking each variable capacity component that meets the desired rate of change, based on a predetermined preference for operating each variable capacity component, and selecting the variable capacity component as the designated variable capacity component based on the ranking.

In other features, the method also includes determining a desired rate of change of a compressor rack operating parameter and varying a capacity of the designated variable capacity component to meet the desired rate of change while the desired rate of change is within a variable capacity range of the designated variable capacity component. The method also includes cycling an additional component of the compressor rack when the designated variable capacity component is operating at a maximum or a minimum capacity and when the desired rate of change is not met.

In other features, the method also includes selecting a different variable capacity component from the plurality of variable capacity components as the designated variable capacity component, when at least two variable capacity components are concurrently operating, based on comparing a variable capacity range of each of the at least two variable capacity components such that a larger variable capacity range is preferred over a smaller variable capacity range.

In other features, the method also includes selecting a different variable capacity component from the plurality of variable capacity components as the designated variable capacity component, when at least two variable capacity components are concurrently operating, based on a run-time of each of the at least two variable capacity components, such that a shorter component run-time is preferred over a longer component run-time.

In other features, the method also includes deactivating the designated variable capacity component after deactivating all other components of the compressor rack.

In other features, deactivating the designated variable capacity component occurs when a pump-down condition is detected.

In other features, the method also includes determining whether a smaller variable capacity component is available and decreasing capacity of the compressor rack by switching the designated variable capacity component to the smaller variable capacity component after deactivating all other components of the compressor rack.

A system is also provided that includes a controller for a compressor rack having a plurality of variable capacity components and a computer readable medium accessible to the controller. The computer readable medium stores a neural network having a plurality of neurons, each neuron being associated with a corresponding variable capacity component and having a neuron output based at least in part on a predetermined preference for operating the corresponding variable capacity component. The controller references the neural network and evaluates the neuron output for each neuron of the neural network. The controller selects a variable capacity component as a designated variable capacity component based on the evaluating, operates the designated variable capacity component by varying a capacity of the designated variable capacity component, and operates each variable capacity component of the plurality of variable capacity components, except for the designated variable capacity component, at a fixed capacity corresponding to one of a maximum and a minimum capacity of each variable capacity component.

In other features, the neuron output is based at least in part on whether a desired rate of change of a compressor rack operating parameter is within a variable capacity range of the corresponding variable capacity component.

In other features, the predetermined preference is determined based on a variable capacity range of the corresponding variable capacity component. The controller evaluates the neuron output for each neuron to select the variable capacity component having a largest variable capacity range, that meets the desired rate of change, as the designated variable capacity component.

In other features, the controller determines a desired rate of change of a compressor rack operating parameter, varies a capacity of the designated variable capacity component to meet the desired rate of change while the desired rate of change is within a variable capacity range of the designated variable capacity component, and cycles an additional component of the compressor rack when the designated variable capacity component is operating at a maximum or a minimum capacity and when the desired rate of change is not met.

In other features, the computer readable medium stores an additional neural network having a plurality of neurons, each neuron being associated with a corresponding variable capacity component and having a neuron output based at least in part on a run time of the corresponding variable capacity component such that a shorter component run-time is preferred over a longer component run-time. The controller evaluates the neuron output for each neuron of the additional network when at least two variable capacity components are concurrently operating and selecting a different variable capacity component as the designated variable capacity component based on the evaluating.

In other features, the computer readable medium stores an additional neural network having a plurality of neurons, each neuron being associated with a corresponding variable capacity component and having a neuron output based at least in part on a variable capacity range of the corresponding variable capacity component such that a larger variable capacity range is preferred over a smaller variable capacity range. The controller evaluates the neuron output for each neuron of the additional network when at least two variable capacity components are concurrently operating and selecting a different variable capacity component as the designated variable capacity component based on the evaluating.

In other features, the controller deactivates the designated variable capacity component after deactivating all other components of the compressor rack.

In other features, the controller deactivates the designated variable capacity component when a pump-down condition is detected.

In other features, the controller determines whether a smaller variable capacity component is available and decreases capacity of the compressor rack by switching the designated variable capacity component to the smaller variable capacity component after deactivating all other components of the compressor rack.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
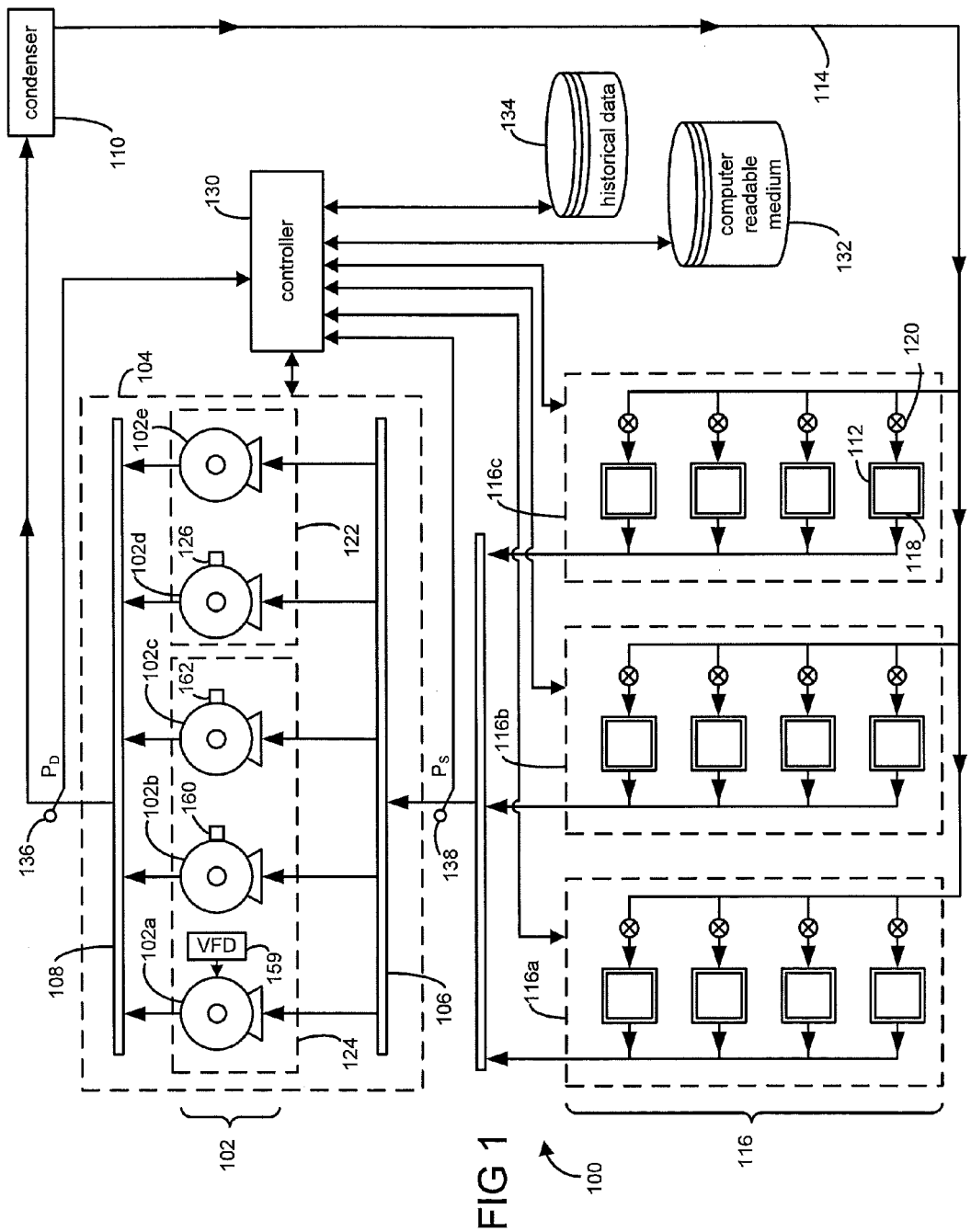
FIG. 1 is a schematic illustration of an exemplary refrigeration system.

The following description is merely exemplary in nature and is not intended to limit the present disclosure, application, or uses. It should be understood that throughout the drawings, corresponding reference numerals indicate like or corresponding parts and features. As used herein, the terms module, control module, computer, and controller refer to an application specific integrated circuit (ASIC), one or more electronic circuits, a processor (shared, dedicated, or group) and memory that execute one or more software or firmware programs, a combinational logic circuit, and/or other suitable components that provide the described functionality. Further, as used herein, computer-readable medium refers to any medium capable of storing data for a computer. Computer-readable medium may include, but is not limited to, CD-ROM, floppy disk, magnetic tape, other magnetic or optical medium capable of storing data, memory, RAM, ROM, PROM, EPROM, EEPROM, flash memory, punch cards, dip switches, or any other medium capable of storing data for a computer.

U.S. patent application Ser. No. 11/732,120, for Refrigeration System Controller and Method, filed on Apr. 2, 2007, U.S. Pub. No. 2007/0240436, is incorporated herein by reference in its entirety. U.S. patent application Ser. No. 11/732, 120, U.S. Pub. No. 2007/0240436, includes a description of a system and method for controlling capacity by utilizing a neural network to evaluate refrigeration system load and to select refrigeration system components, such as compressor rack components including compressors and unloaders, for cycling, i.e., activation or deactivation.

The present teachings are directed to controlling parallel compressor racks that contain multiple variable capacity devices or components. Generally, a control algorithm for a compressor rack with multiple variable capacity components may account for three scenarios. First, the control algorithm may account for when to activate a variable capacity component when a variable capacity component is not currently activated. Second, the control algorithm may account for when to activate a variable capacity component when one or more variable capacity components are already activated. Third, the control algorithm may account for when to turn off a variable capacity component. The control algorithm may determine the most appropriate use of variable capacity components to obtain accurate control over compressor rack capacity in accordance with system load. For example, the control algorithm may determine the most appropriate use of variable capacity components to obtain accurate control over compressor rack suction pressure, or another sensed system parameter. Further the control algorithm may minimize switching of compressor motors.

The control algorithm may designate one variable capacity component as the active variable capacity component, or "AVC." The AVC may be operated in a variable capacity state, whereas any remaining variable capacity components may be switched as fixed stages. By designating a single variable capacity component as the AVC, the control algorithm may prevent multiple variable capacity components from being concurrently operated in a variable capacity state. In this way, the control algorithm may avoid unexpected or unpredictable operation that may have resulted from multiple pulse width modulated devices being operated concurrently. When multiple pulse width modulated devices are operated concurrently, suction pressure may oscillate unpredictably. By designating a single variable capacity component as the AVC, unpredictable operation is minimized.

In assigning a variable capacity component as the AVC, the control algorithm may choose the variable capacity component with the largest variable capacity range. In this way, the component may remain the AVC for the maximum amount of time and the need to switch other devices as refrigeration system load varies may be minimized.

The control algorithm may continue operation of the AVC for as long as possible so as to allow maximum flexibility in modulating capacity according to refrigeration system load. In this way, control algorithm may continue operation of the AVC unless or until it is necessary to deactivate the AVC after all other components have been deactivated. For example, if suction pressure is nearing a pump-down condition and the AVC is the last component in operation, the control algorithm may deactivate the AVC. A pump down condition may occur when capacity is greater than refrigeration system load and suction pressure is heading to zero pounds. A pump down condition may cause damage to refrigeration system components unless capacity is rapidly decreased and suction pressure is increased. The control algorithm may deactivate all other compressor rack components and stages until the AVC is the only active component remaining. In such case, if the pump-down condition remains, the AVC may then be deactivated. When suction pressure returns to normal operation, the control algorithm may then take steps to activate a compressor rack component, including a variable capacity component.

With reference to FIG. 1, a refrigeration system 100 may include a plurality of compressors 102 piped together in a compressor rack 104 with a suction header 106 and a discharge header 108. Compressors 102 may compress refrigerant vapor that may then be delivered to a condenser 110 to be liquefied at high pressure. This high pressure liquid refrigerant may be delivered to a plurality of refrigeration cases 112 by way of piping 114.

Refrigeration cases 112 may be arranged in separate circuits 116. Each circuit 116 may consist of a plurality of refrigeration cases 112 which may operate within similar temperature ranges. In FIG. 1, three circuits 116a, 116b, 116c are shown. Each circuit 116 is shown consisting of four refrigeration cases 112. Any number of circuits, with any number of refrigeration cases 112, may be used. Each circuit 116 may generally operate within a predetermined temperature range. For example, circuit 116a may be for frozen food, circuit 116b may be for dairy, circuit 116c may be for meat, etc. Each refrigeration case 112 may include its own evaporator 118 and its own expansion valve 120 for controlling refrigerant superheat.

In FIG. 1, while five compressors 102 are shown in compressor rack 104, any number of compressors may be used. Compressor rack 104 may include a variable capacity group 124, including compressors 102a, 102b, 102c, and a fixed capacity group 122, including compressors 102d, 102e.

Fixed capacity group 122 may include fixed capacity components. For example, compressors 102d, 102e may be fixed speed compressors that operate at a fixed capacity. Compressors 102d, 102e may be either on or off. In this way, compressors 102d, 102e may be switched between an activated state and a deactivated state. Capacity of each fixed compressor 102d, 102e, however, may vary from one compressor to another within fixed capacity group 122.

Compressors 102d, 102e in fixed capacity group 122 may be equipped with one or more fixed unloader components 126. Fixed unloader component 126 may decrease capacity of its associated compressor 102d by a fixed amount. Fixed unloader component 126 may be implemented in a number of ways and may create a leak path between a suction side and a discharge side of its associated compressor 102d. Fixed unloader component 126 may be either on or off and may be switched between an activated state and a deactivated state.

In FIG. 1, fixed capacity group 122 is shown with two compressors: compressor 102e is shown without an unloader component; and compressor 102d is shown with fixed unloader component 126. Fixed capacity group 122 may include any combination of fixed compressors 102d, 102e with any combination of fixed unloader components 126.

Compressor rack 104 may also include variable capacity group 124 which may include variable capacity components. Variable capacity group 124 may include a variable speed compressor 102a driven by a variable frequency drive (VFD) 159. VFD may receive alternating current from a power supply and may include solid state electronics to modulate the frequency of the alternating current. Generally, VFD may convert each phase of electrical power received from a power supply from AC to DC and may then convert each phase of electrical power from DC back to AC at a desired frequency. For example, VFD 159 may receive alternating current at sixty-hertz and may deliver thirty-hertz alternating current to compressor 102a. In such case, compressor 102a may operate at half speed based on the frequency of electrical power received from VFD 159. Thus, by operating compressor 102a at half speed, compressor 102a may be operated at half capacity. A variable compressor connected to a power supply designed to vary the frequency of the alternating current supplied to the driving motor such that operating speed of the compressor is selected in accordance with demand loading is described in U.S. Pat. No. 4,563,624, the disclosure of which is incorporated herein by reference.

Variable capacity group 124 may include a fully unloadable compressor 102b with a capacity modulation system 160 for fully unloading compressor 102b and operating compressor 102b at any capacity between zero percent and one-hundred percent. For example, fully unloadable compressor 102b may be a scroll compressor and capacity modulation system 160 may be a scroll member separation system. In such case, capacity may be modulated by separating the intermeshed scroll members of the scroll compressor to create a leak path between a suction and a discharge side of the scroll compressor. Scroll member separation system may include a solenoid. The intermeshed scroll members may be periodically separated by pulse width modulation of the solenoid to attain a desired capacity. A scroll compressor with a scroll separation system that unloads the compressor by periodically separating the scroll members during an operating cycle of the compressor is described in U.S. Pat. No. 6,213,731, the disclosure of which is incorporated herein by reference.

Pulse width modulated scroll separation during a portion of an operating cycle may be used to determine the capacity, as a percentage of full capacity, of compressor. For example, compressor may be operated over a ten second operating cycle. To achieve fifty percent capacity, solenoid may be operated according to alternating five second periods of activation and deactivation to achieve alternating five second periods of scroll member separation.

Fully unloadable compressor 102b may also be a reciprocating compressor with a capacity modulation system 160 for fully unloading compressor capacity at any capacity between zero percent and one-hundred percent.

Any other compressor and capacity modulation system that can be configured and operated to achieve full capacity modulation may be used as compressor 102b and capacity modulation system 160.

Variable capacity group 124 may include a partially unloadable compressor 102c with a capacity modulation system 162 for partially unloading compressor 102c. For example, partially unloadable compressor 102c may be a reciprocating compressor and capacity modulation system 162 may be an unloader for decreasing capacity of the reciprocating compressor to between one-hundred percent and fifty percent. In this way, partially unloadable compressor 102c may be operated at zero percent, when the compressor motor is deactivated. Partially unloadable compressor 102c may be operated at fifty percent when the compressor motor is activated and capacity modulation system 162 is fully activated. Further, partially unloadable compressor 102c may be operated at any capacity between fifty percent and one-hundred percent as controlled by capacity modulation system 162.

Partially unloadable compressor 102c may also be a scroll compressor and capacity modulation system 162 may be a delayed suction system. Delayed suction system may utilize ports provided at one or more positions which, when opened with valves, allow an initially formed compression chamber between the scroll members to communicate with a suction chamber of the compressor. A scroll compressor with a delayed suction system that modulates compressor capacity by periodically venting an intermediate pressurized chamber to the suction chamber is described in U.S. Pat. No. 6,821,092, the disclosure of which is incorporated herein by reference. In this way, partially unloadable compressor 102c may be operated at one-hundred percent, when the ports are closed, and some fraction of one-hundred percent, such as sixty-seven percent, when the ports are open. The ports may be operated in a pulse width modulation fashion to achieve capacity between the fully open capacity and the fully closed capacity.

Any other compressor and capacity modulation system that can be configured and operated to achieve partial capacity modulation may be used as compressor 102c and capacity modulation system 162.

In this way, variable capacity group 124 may include variable speed compressor 102a with variable frequency drive 159, fully unloadable compressor 102b with capacity modulation system 160, and partially unloadable compressor 102c with capacity modulation system 162. Any combination of variable components may be used. For example, additional or fewer variable speed compressors 102a may be included, additional or fewer fully unloadable compressors 102b may be included, and additional or fewer partially unloadable compressors 102c may be included.

The various compressor rack components, including compressors 102, capacity modulation systems 160, 162, etc., may be in communication with, and controlled by, a controller 130. For ease of viewing and clarity, electrical and communication connections between each of the individual compressor rack components and controller 130 are not shown in FIG. 1.

Controller 130 may be an Einstein or E2 controller available from Computer Process Controls, Inc., 1640 Airport Road Suite # 104, Kennesaw, Ga. 31044, such as the E2 RX refrigeration controller. Controller 130 may monitor system operating parameters and operate each of the compressor rack components according to refrigeration system load. Controller 130 may execute software, i.e., computer executable instructions, stored in a computer-readable medium 132 accessible to controller 130. Additionally, controller 130 may access historical data stored in a historical database 134 accessible to the controller 130.

For example, controller 130 may monitor a discharge pressure sensor 136 that may generate a discharge pressure signal ($P_D$) based on a discharge pressure of compressor rack 104. Controller 130 may also monitor a suction pressure sensor 138 that may generate a suction pressure signal ($P_S$) based on a suction pressure of compressor rack 104.

Figure 5:
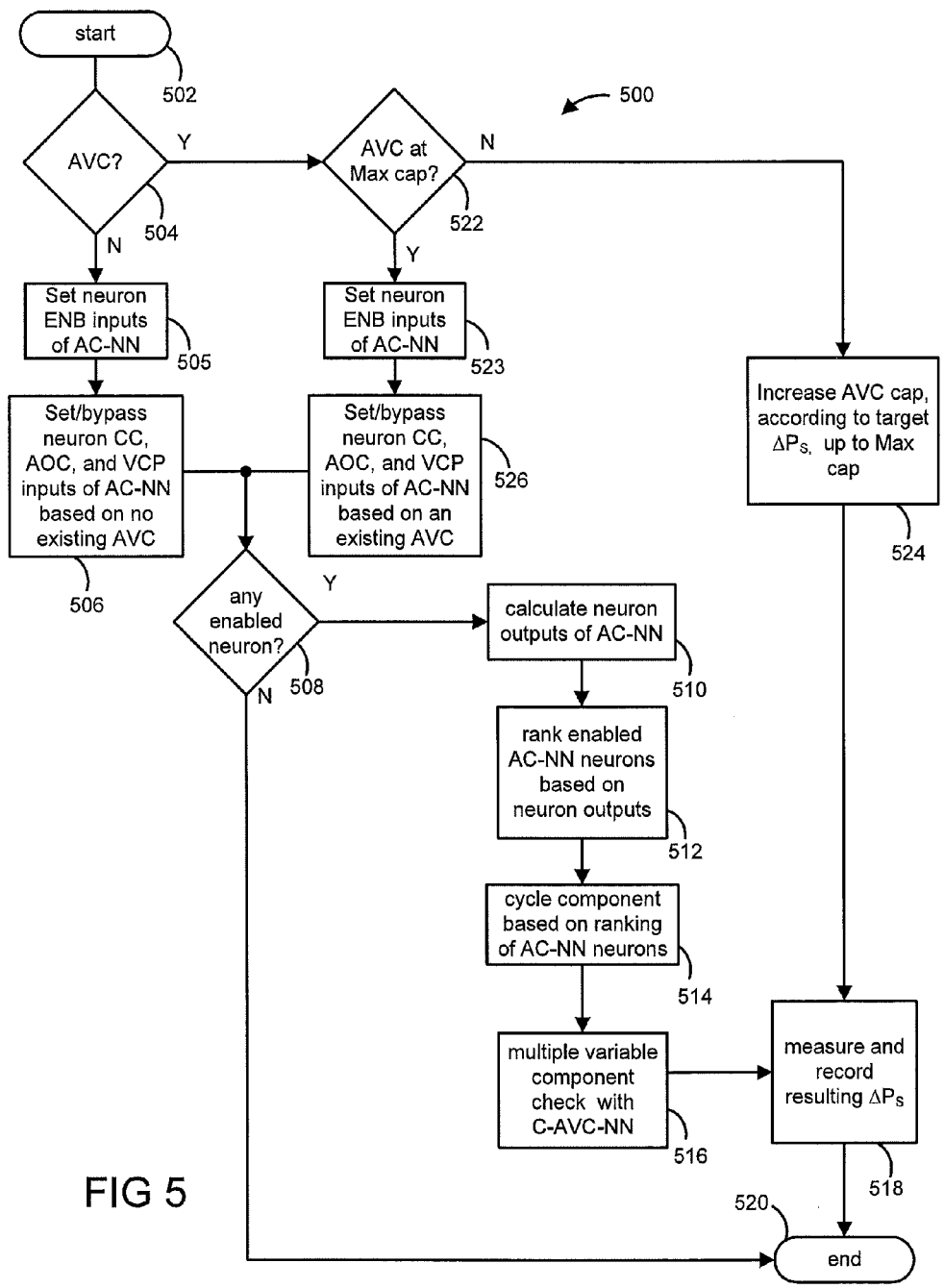
FIG. 5 is a flowchart illustrating a capacity control algorithm.

Controller 130 may also monitor the states of each of circuits 116 and determine a corresponding circuit index based on the current circuit states and a circuit index table. A circuit index table is shown in FIG. 5 of U.S. patent application Ser. No. 11/732,120, U.S. Pub. No. 2007/0240436, and described therein. Generally, circuits 116 may be in a defrost state, a pull-down state, or a normal state. Additional circuit states may be used. In a defrost state, circuit refrigeration load may effectively be zero for that circuit 116. In a pull-down state, circuit refrigeration load may be near the maximum load for the circuit 116. In a normal state, circuit refrigeration load may be between the defrost and pull-down state refrigeration loads.

Controller 130 may monitor operating parameters and control components to adjust capacity based on current system load. For example, controller 130 may monitor $P_S$, as indicated by suction pressure sensor 138, and adjust capacity according to a suction pressure set-point. When $P_S$ exceeds the suction pressure set-point, controller 130 may increase or "add" capacity by, for example, activating a deactivated compressor 102, increasing speed and capacity of variable speed compressor 102a, increasing capacity of fully unloadable compressor 102b with capacity modulation system 160, increasing capacity of partially unloadable compressor 102c with capacity modulation system 162, deactivating an activated fixed unloader component 126, etc. When $P_S$ is below the suction pressure set-point, controller 130 may likewise decrease or "subtract" capacity by deactivating an activated compressor 102, decreasing speed and capacity of variable speed compressor 102a, decreasing capacity of fully unloadable compressor 102b with capacity modulation system 160, decreasing capacity of partially unloadable compressor 102c with capacity modulation system 162, activating a deactivated fixed unloader component 126, etc.

Other operating parameters and other operating parameter set-points may be used. For example, controller 130 may adjust capacity based on a suction or discharge temperature and a suction or discharge temperature set-point.

As discussed in U.S. patent application Ser. No. 11/732,120, U.S. Pub. No. 2007/0240436, compressor rack capacity may be controlled by utilizing a neural network to evaluate refrigeration system load and to select compressor rack components for cycling, i.e., activation or deactivation, and for capacity modulation, i.e., increasing or decreasing capacity. Compressor rack capacity may be modulated by selecting the component that best fits the current system load and target $P_S$ and/or rate of $P_S$ change (referred to as "$\Delta P_S$"), based on historical data 134 of refrigeration system 100.

Figure 6A:
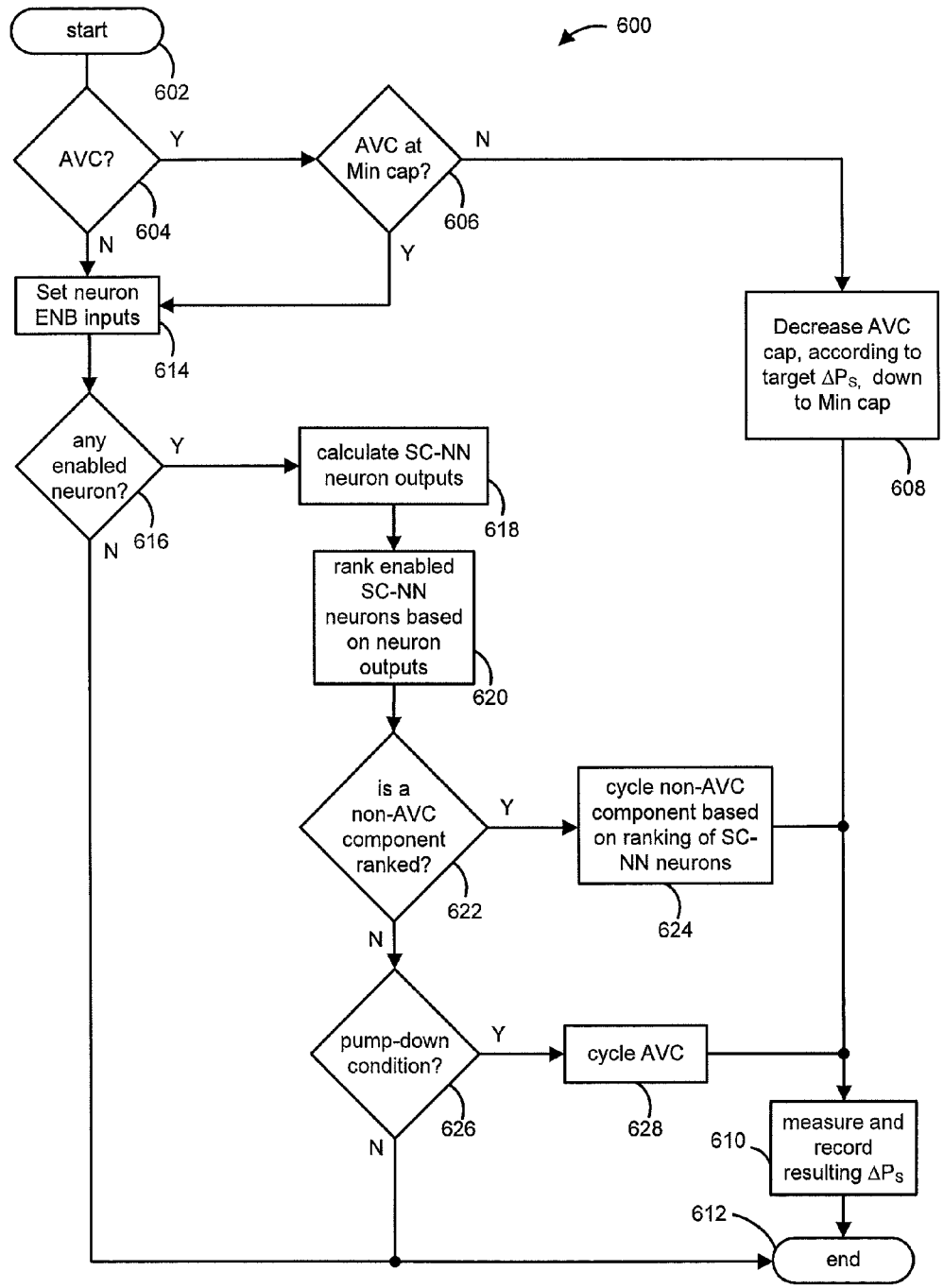
FIG. 6A is a flowchart illustrating a capacity control algorithm.
Figure 6B:
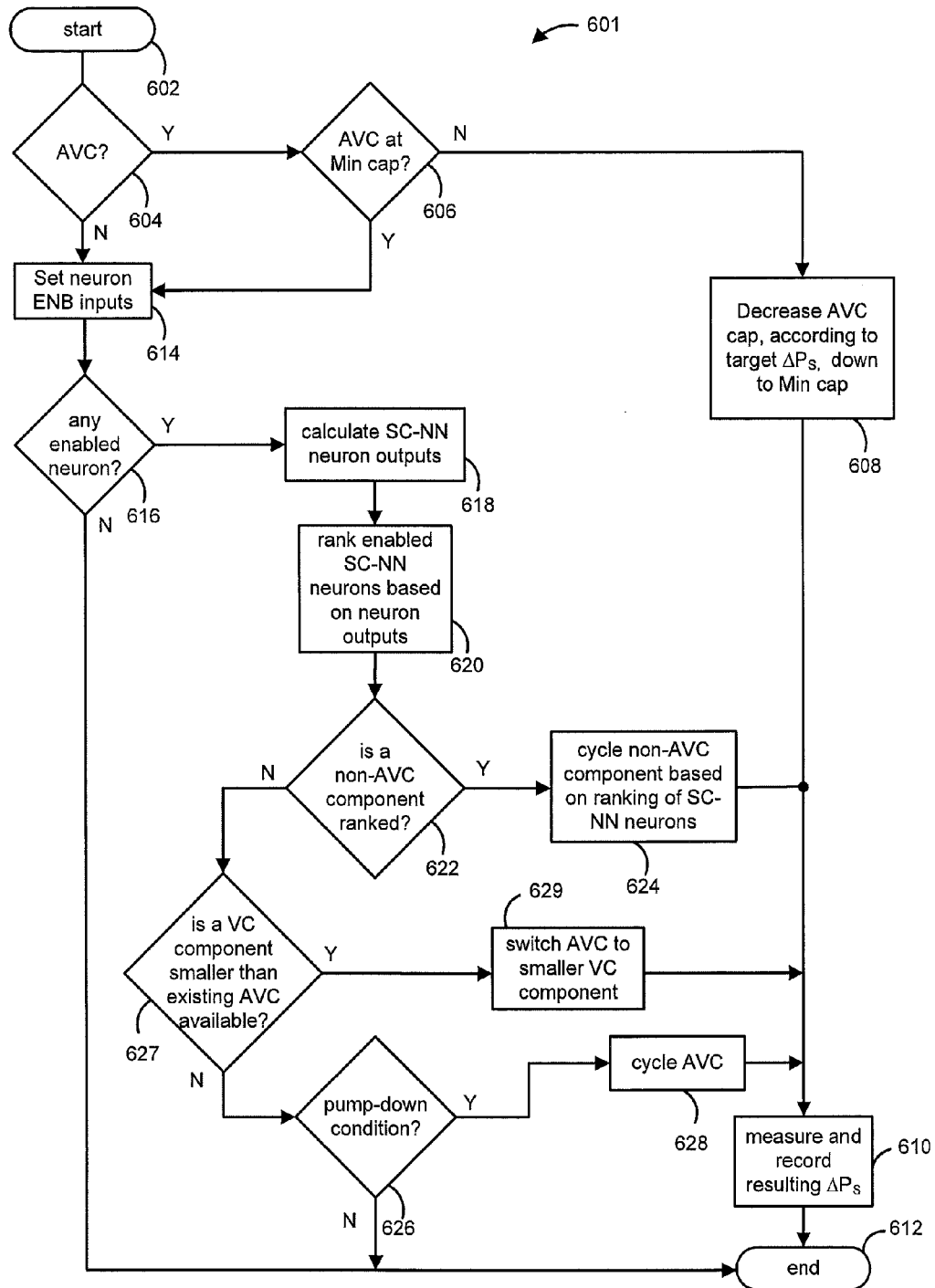
FIG. 6B is a flowchart illustrating a capacity control algorithm.

Compressor rack components may be represented by a neuron both in an "add capacity neural network" ("AC-NN") and in a "subtract capacity neural network" ("SC-NN"). AC-NN is used by controller 130 for increasing capacity. SC-NN is used by controller for decreasing capacity. In both neural networks, compressor rack components are represented by a neuron that includes an appropriate rate table, either an activation rate table or a deactivation rate table. The neuron representations of compressor rack components and the various neural networks may be stored in computer-readable medium 132, as part of historical database 134, or in additional computer-readable medium internal or external to controller 130. Activation and deactivation rate tables are shown in FIGS. 6A and 6B of U.S. patent application Ser. No. 11/732,120, U.S. Pub. No. 2007/0240436, and described in the accompanying description thereof. For example, in the AC-NN, fixed compressor 102e may be represented by a neuron that includes an activation rate table for fixed compressor 102e as activation of fixed compressor 102e may increase or "add" capacity to the system. Likewise, in the SC-NN, fixed compressor 102e may be represented by a neuron that includes a deactivation rate table for fixed compressor 102e as deactivation of fixed compressor 102e may decrease or "subtract" capacity from the system.

As described in U.S. patent application Ser. No. 11/732, 120, U.S. Pub. No. 2007/0240436, each neuron may have weighted inputs corresponding to different factors considered during a component selection decision. The weighted inputs may be added together and used to generate a neuron output. The neuron with the highest output may be the "winning" neuron. In this way, controller 130 may rank components according to neuron output, and may select a component for cycling based on the ranking. Controller 130 may cycle the highest ranked component corresponding to the winning neuron and appropriately update historical data 134. For example, controller 130 may update historical data 134 to reflect a change in $\Delta P_S$ resulting from cycling the particular component.

Figure 2:
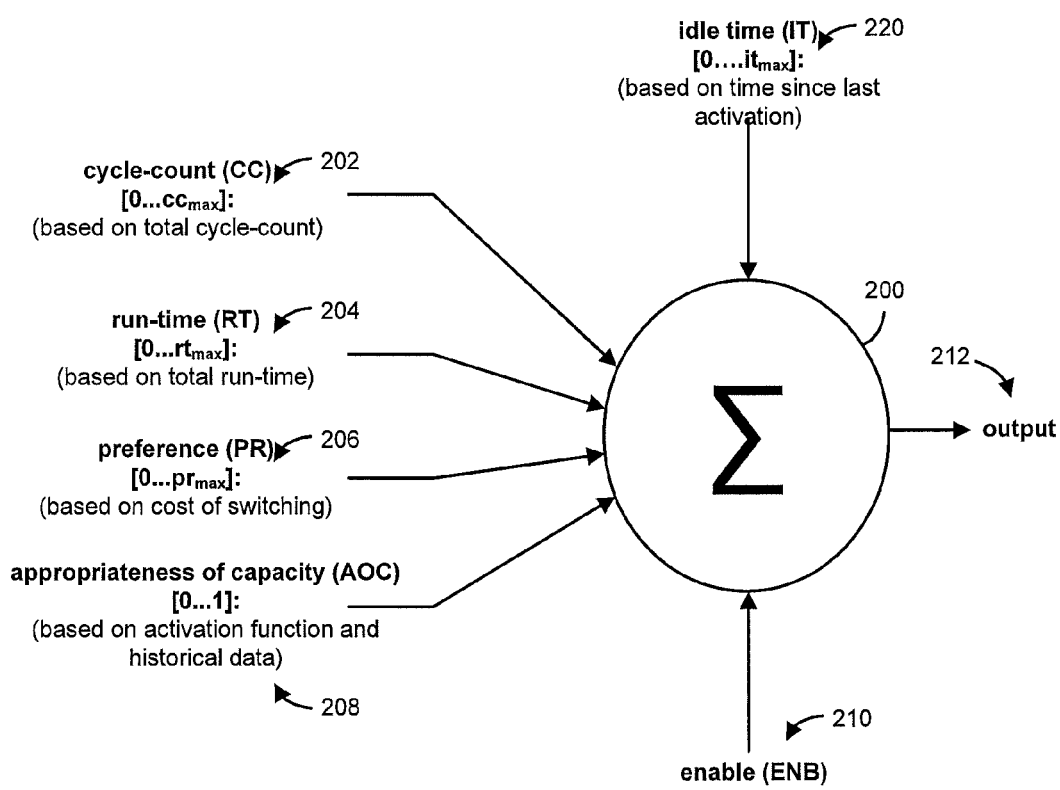
FIG. 2 is a diagram of a neuron representing a refrigeration system component.

As shown in FIG. 2, a neuron 200 may include five inputs: cycle-count (CC) input 202, run-time (RT) input 204, preference (PR) input 206, appropriateness of capacity (AOC) input 208, idle time (IT) input 220, and enable (ENB) input 210. These inputs are described in detail in U.S. patent application Ser. No. 11/732,120, U.S. Pub. No. 2007/0240436. Further, the specific calculations associated with the activation function, the indexing of historical data according to circuit states, the interpolation of historical data, the activation rate table, and the deactivation rate table are likewise described in detail in U.S. patent application Ser. No. 11/732,120, U.S. Pub. No. 2007/0240436.

ENB input 210 may indicate that neuron 200 is enabled when the component corresponding to neuron 200 is available for cycling consistent with the present goal. For example, a neuron corresponding to fixed unloader component 126 may be enabled only when compressor 102d is activated because cycling fixed unloader component 126 may only affect capacity when compressor 102d is activated. In addition, in AC-NN a neuron corresponding to compressor 102e may only be enabled if compressor 102e is currently deactivated. If compressor 102e is already activated, and if controller 130 is attempting to increase capacity with AC-NN, then cycling or deactivating compressor 102e, which is already activated, would not serve to increase capacity. In such case the neuron in AC-NN corresponding to compressor 102e would not be enabled.

In SC-NN, compressor rack components may each be represented by a neuron corresponding to neuron 200 shown in FIG. 2. In AC-NN, compressor rack components of fixed capacity group 122 may each be represented by a neuron corresponding to neuron 200 shown in FIG. 2.

When adding capacity with AC-NN and when there currently is no AVC, controller 130 must determine which variable capacity component of variable capacity group 124 to add. Further, when there is currently no AVC, it is beneficial to add a variable capacity component to allow for maximum flexibility in modulating system capacity.

Figure 3:
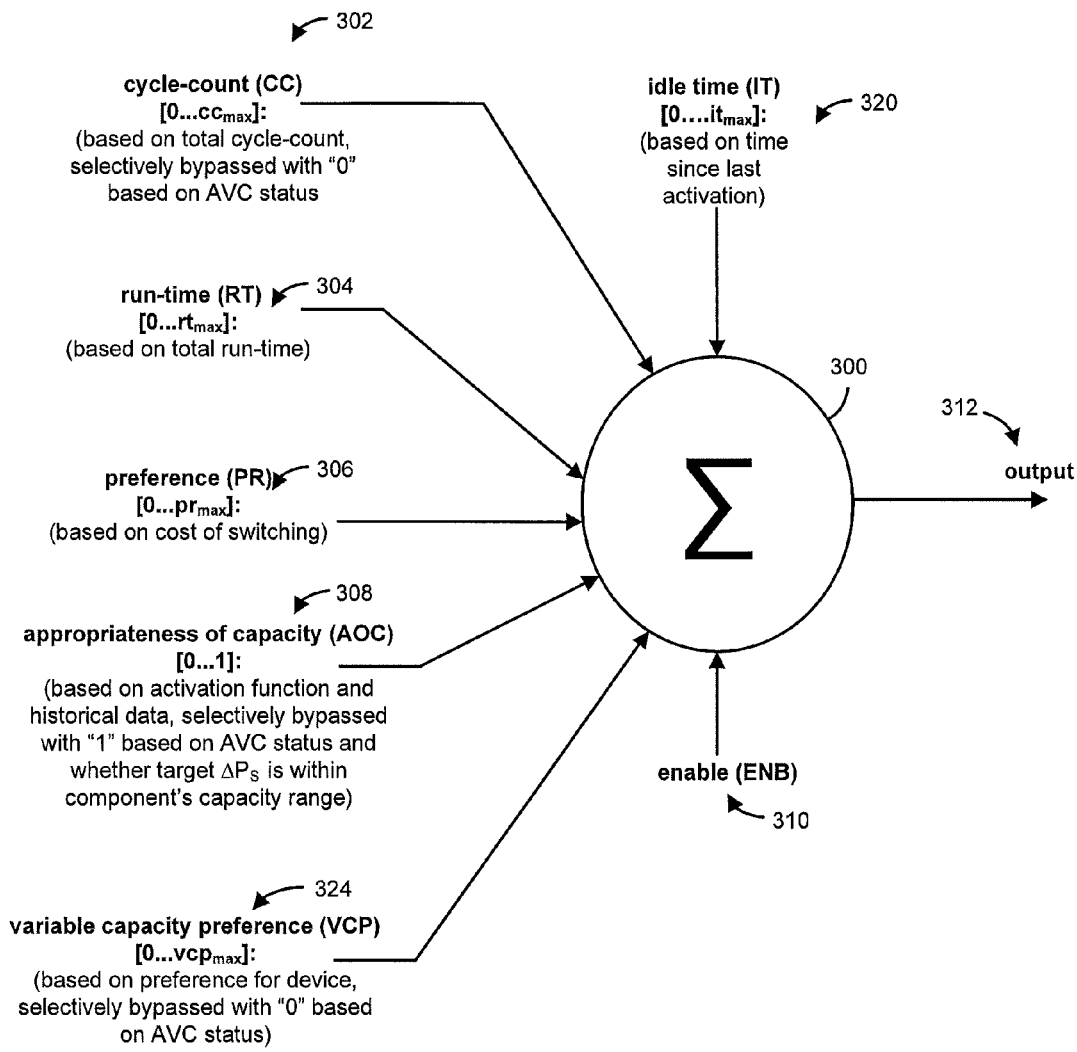
FIG. 3 is a diagram of a neuron representing a refrigeration system component.

For these reasons, the neuron corresponding to variable capacity components of variable capacity group 124 are represented in AC-NN with neurons corresponding to a neuron 300 as shown in FIG. 3. Neuron 300 includes CC input 302, RT input 304, PR input 306, AOC input 308, ENB input 310, and IT input 320, as described above with respect to FIG. 2 and in U.S. patent application Ser. No. 11/732,120, U.S. Pub. No. 2007/0240436. In addition, neuron 300 includes a variable capacity preference (VCP) input 324. Further, neuron 300 includes bypass functionality with respect to CC input 302, AOC input 308, and VCP input 324, as discussed in more detail below.

VCP input 324 may be predetermined and set between 0 and a user defined maximum ($vcp_{max}$). Generally, $vcp_{max}$ may be a real number set by the user to a value greater than 0 according to the user's preference. In this way, the variable capacity components may be ranked according to preference.

For example, with reference to the components of variable capacity group 124 shown in FIG. 1, capacity modulation system 162 for partially unloading compressor 102c may be ranked highest (although it may only be enabled if its associated compressor 102c is activated). Fully unloadable compressor 102b with capacity modulation system 160 may be ranked second highest. Fully unloadable compressor 102b with capacity modulation system 160 may be represented by a single neuron in AC-NN, corresponding to neuron 300. Variable speed compressor 102a driven by VFD 159 may be ranked third highest. Variable speed compressor 102a and VFD 159 may be represented by a single neuron in AC-NN, corresponding to neuron 300. Partially unloadable compressor 102c may be ranked fourth highest.

Partially unloadable compressor 102c and capacity modulation system 162 for partially unloadable compressor 102c may be represented by two separate neurons in AC-NN. Partially unloadable compressor 102c, although not actually a variable capacity component, standing alone, may be provided with a variable capacity preference ranking. Activation of partially unloadable compressor 102c enables subsequent activation of an actual variable capacity component, i.e., capacity modulation system 162 for partially unloading compressor 102c. As discussed above, activation of compressor 102c alone may result in increasing system capacity by a fixed amount of, for example, fifty percent of compressor 102c capacity. If control algorithm is deciding between activation of a fixed compressor and activation of compressor 102c, because activation of compressor 102c may enable subsequent activation of a variable capacity component, i.e., capacity modulation system 162, activation of compressor 102c is preferred over activation of a fixed compressor of similar capacity. Thus, VCP input 324 for compressor 102c is weighted accordingly.

Capacity modulation system 162 may be ranked highest, although it may only be enabled if its associated compressor 102c is activated. If compressor 102c has previously been activated, then capacity may subsequently be modulated by capacity modulation system 162. The cost of activating capacity modulation system 162, given that compressor 102c is already activated, may be less than activating another variable capacity component. Thus, capacity modulation system 162 may be ranked highest.

VCP input 324 may increase the likelihood that a variable capacity component is selected for activation when there is currently no AVC. When there is already an AVC, VCP input 324 is bypassed with "0" and the variable capacity components of variable capacity group 124 may be treated, and cycled, as fixed capacity components, similar to the fixed capacity components of fixed capacity group 122.

In AC-NN, when initially selecting a variable capacity component for activation with no currently existing AVC, certain neuron inputs for neurons corresponding to variable capacity components may be bypassed with predetermined default values. For example, AOC input 308 may be bypassed with a "1" value when no AVC is currently selected and when the target $\Delta P_S$ is within the capacity range of the particular variable capacity component. In this way, the activation function is bypassed for variable capacity components when the variable capacity component can satisfy the current target $\Delta P_S$ at some percentage of full capacity. The probability that the particular neuron will "win" and that the corresponding variable capacity component will be cycled may be increased. If more than one variable capacity component is able to satisfy current target $\Delta P_S$, then other inputs may determine the winning neuron as between the variable capacity components.

If current target $\Delta P_S$ is greater than the maximum capacity rate for the particular variable capacity component, then the maximum rate may be processed through the activation function, as described in U.S. patent application Ser. No. 11/732,120, U.S. Pub. No. 2007/0240436. If current target $\Delta P_S$ is less than the minimum capacity rate for the particular variable capacity component, then the minimum rate may be processed through the activation function, as described in U.S. patent application Ser. No. 11/732,120, U.S. Pub. No. 2007/0240436.

When there is currently no AVC, CC input 302 may be disabled or bypassed with a "0" for variable capacity components. In this way, run times, may be more determinative of neuron output and cycle count may not affect neuron output. Because the AVC is not switched very often, a particular variable capacity device may have a low CC input 302. At the same time, the particular variable capacity device may have a high run-time input 304, due to being the AVC for a long period of time. Further, while a particular variable capacity component is serving as the AVC, other variable capacity components may be cycled as fixed capacity components. Consequently, the other non-AVC variable capacity components may develop higher cycle-counts. For this reason, wear on a variable capacity component may be more closely tied to run-time than to cycle-count. For this reason, CC input 302 may be bypassed with a zero for neurons corresponding to variable capacity components in AC-NN when there currently is no AVC.

Figure 4:
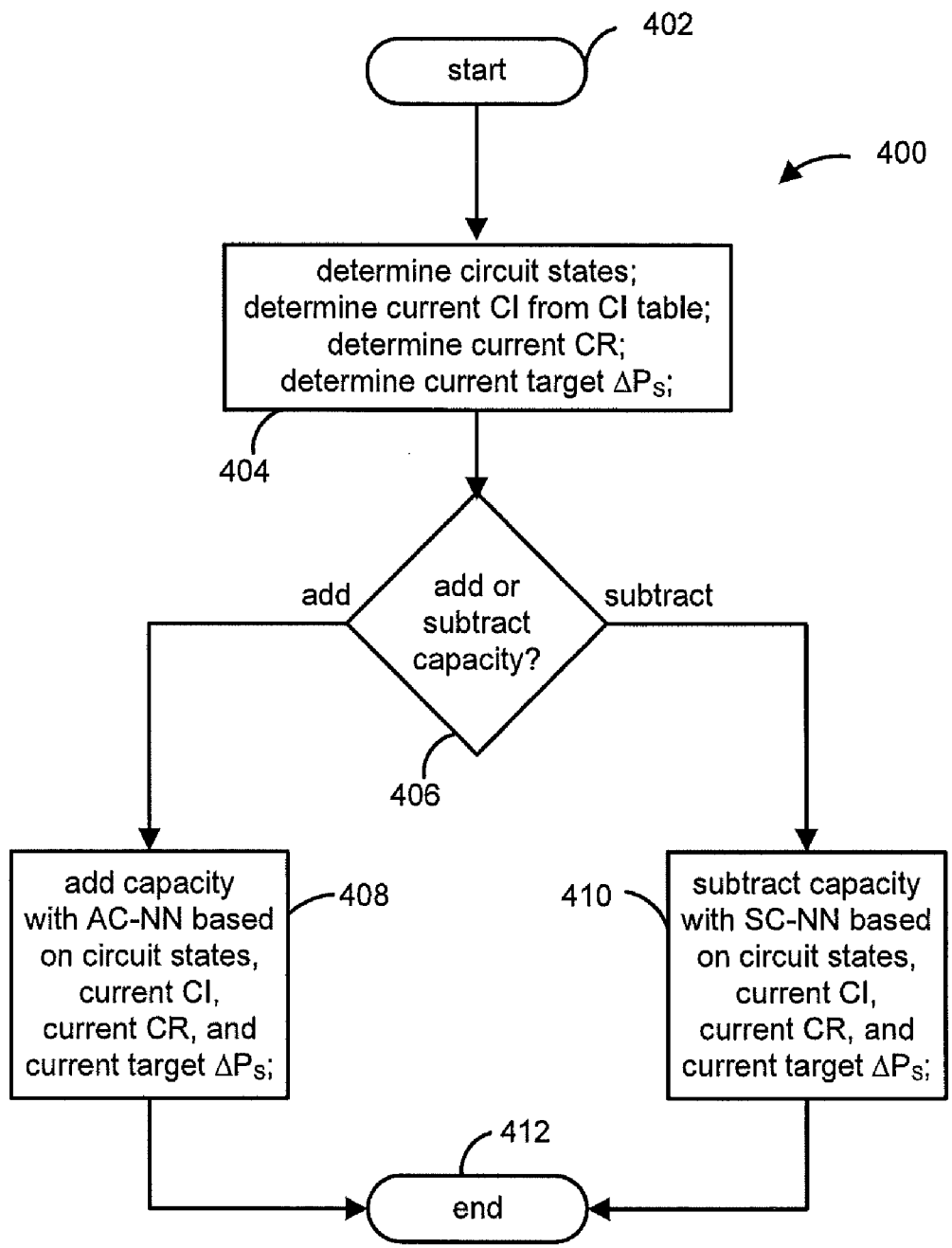
FIG. 4 is a flowchart illustrating a capacity control algorithm.

In FIG. 4, a control algorithm 400 for modulating compressor rack capacity may be executed by controller 130 and may start in step 402. In step 404, controller 130 may determine circuit states and current circuit index, or "CI", from a CI table. A CI table is shown in FIG. 5 of U.S. patent application Ser. No. 11/732,120, U.S. Pub. No. 2007/0240436, and described therein. In step 404, controller 130 may also determine current compression ratio by comparing $P_D$ to $P_s$. In step 404, controller 130 may also determine current target $\Delta P_S$. These steps are shown and described in U.S. patent application Ser. No. 11/732,120, U.S. Pub. No. 2007/0240436, including FIGS. 11 and 12 and the accompanying description therein.

In step 406, controller 130 may determine whether it needs to add capacity or subtract capacity based on current target $\Delta P_S$ and current $\Delta P_S$. In step 408, when controller 130 determines that it needs to add capacity, controller 130 may add capacity with AC-NN based on the circuit states, current CI, current CR, and current target $\Delta P_S$. In step 410, when controller 130 determines that it needs to subtract capacity, controller 130 may subtract capacity with SC-NN based on the circuit states, current CI, current CR, and current target $\Delta P_S$. The control algorithm 400 ends in step 412.

With reference to FIG. 5, a control algorithm 500 for adding capacity with AC-NN may be executed by controller 130. The functionality described in FIG. 5 may correspond generally with the functionality encapsulated in step 408 of FIG. 4. Control algorithm 500 may start in step 502.

In step 504, controller 130 may determine whether there currently is an existing AVC. As described above, one variable capacity component may be the designated AVC. When there currently is no AVC, control algorithm 500 may take steps to activate a variable capacity device and designate it as the AVC. When there is currently an existing AVC, control algorithm 500 may modulate capacity by modulating capacity of the AVC. As described in more detail below, when two variable capacity devices are activated, controller 130 may determine which variable capacity device to designate as the AVC. In this way, the AVC "baton" may be controlled.

In step 505, when there currently is no existing AVC, controller 130 sets neuron ENB inputs 210, 310 of neurons in AC-NN. ENB inputs are set depending on whether the component corresponding to the particular neuron is available for cycling consistent with the present goal. In step 506, controller 130 may set or bypass CC input 302, AOC input 308, and VCP input 324 for neurons of AC-NN corresponding to variable capacity components.

As described above, when there currently is no AVC, CC input 302 is bypass with a "0" to remove cycle-count from the neuron output calculation for variable capacity components. When there currently is no AVC, AOC input 308 may be bypassed for variable capacity components depending on whether the corresponding variable capacity component may meet the current target $\Delta P_S$. If the corresponding variable capacity component may meet current target $\Delta P_S$ within its capacity range, AOC input 308 may be bypassed with a "1". When there currently is no AVC, VCP input 324 may be set to the predetermined preference ranking for inclusion in the neuron output calculation.

In step 508, controller may determine whether any neuron is enabled. When no neuron is enabled, control algorithm 500 ends in step 520. When a neuron is enabled in step 508, controller may calculate neuron outputs 212, 312 for the neurons of the AC-NN in step 510. In step 512, enabled neurons of AC-NN are ranked based on neuron outputs 212, 312. In step 514, a component is cycled based on the ranking of ACC-NN neurons. Thus, in step 514, the "winning" neuron is selected based on neuron outputs 212, 312 and based on the ranking. With the weighting, setting, and bypassing of inputs described above, when there is no current existing AVC and when a variable capacity component is available for cycling, there may be a high probability that a variable capacity component may be selected for cycling.

Figure 7:
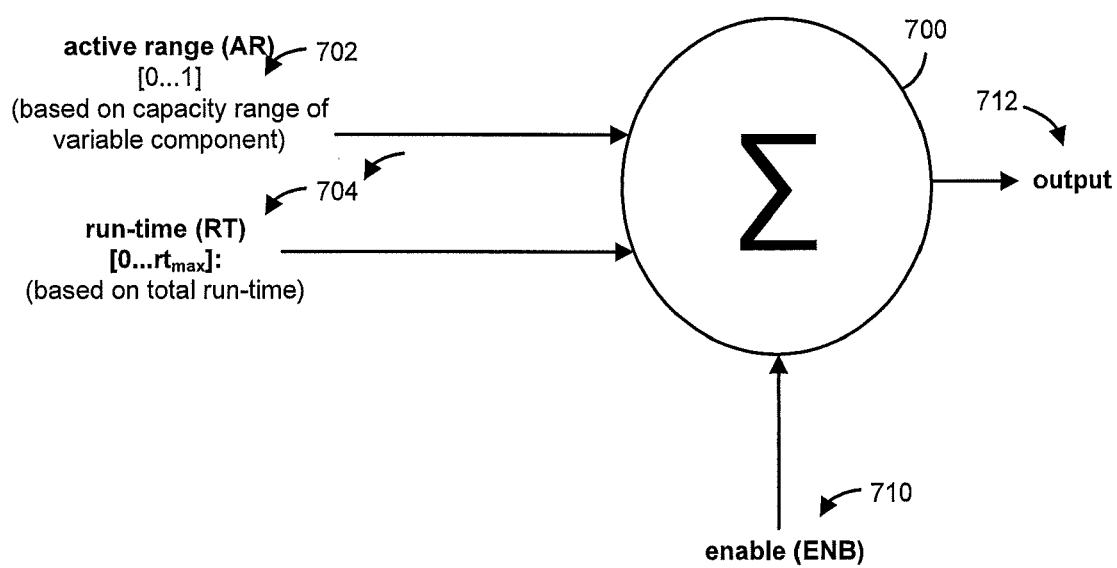
FIG. 7 is a diagram of a neuron representing a refrigeration system component.

In step 516, controller 130 may perform a multiple variable component check with a "check AVC neural network" or "C-AVC-NN". This check is performed to determine whether two variable capacity components are activated and, if so, whether the current AVC should be switched. The functionality of step 516 and the C-AVC-NN is described in more detail with respect to FIGS. 7 and 8 below.

In step 518, controller 130 may measure and record the $\Delta P_S$ resulting from cycling or modulating the particular component as part of historical data 134. This step is described in FIG. 11 of U.S. patent application Ser. No. 11/732,120, U.S. Pub. No. 2007/0240436, and the accompanying description therein. After measuring and recording in step 518, control algorithm 500 ends in step 520.

With reference again to step 504, when there currently is an AVC, controller 130 proceeds to step 522 and determines whether the current AVC is at maximum capacity. When the current AVC is not at maximum capacity, controller increases capacity of AVC according to target $\Delta P_S$ Capacity of AVC may be increased up to the maximum capacity of AVC. When there is currently an AVC, control algorithm 500 maximizes capacity of AVC before cycling any other compressor rack components. In step 518, resulting $\Delta P_S$ is measured and recorded and control algorithm 500 ends in step 520.

In step 522, when AVC is currently at maximum capacity, then control algorithm 500 may proceed to search for another compressor rack component for cycling. When there currently is an AVC existing, remaining compressor rack components, including variable capacity group 124 components, are switched as fixed stages. When operated as fixed stages, components of variable capacity group 124 may be operated at maximum capacity or at minimum capacity only. For example, a variable speed compressor 102a may be treated as a fixed stage with a capacity of one-hundred percent of its variable capacity when activated or a capacity of zero percent of its variable capacity when deactivated.

In step 523, controller 130 sets neuron ENB inputs 210, 310. In step 526, controller 130 sets or bypasses neuron CC inputs 302, AOC inputs 308, and VCP inputs 324 based on there being a current AVC. In this step, because there currently is an AVC existing, CC input 302 is not bypassed with "0". Further, AOC input 308 is calculated normally, as it would be for any fixed capacity component. VCP input 324 is bypassed with "0" to remove any preference for variable capacity components. In this way, variable capacity components are cycled and treated as fixed capacity components. Once the inputs are set or bypassed in step 526, controller 130 proceeds with steps 508 to 518, as discussed above, and searches for a compressor rack component for cycling. If two variable capacity components become activated, controller 130 performs a multiple variable component check with C-AVC-NN in step 516, as discussed in more detail below.

With reference to FIG. 6A, a control algorithm 600 for decreasing or subtracting capacity with SC-NN may be executed by controller 130. The functionality described in FIG. 6A may correspond generally with the functionality encapsulated in step 410 of FIG. 4. Control algorithm 600 may start in step 602.

In step 602, controller 130 may determine whether there currently is an existing AVC. In step 606, when there is an existing AVC, controller may determine whether the current AVC is at its minimum capacity. In step 608, when the current AVC is not at its minimum capacity, controller 130 may decrease capacity of AVC, according to target $\Delta P_S$, down to the AVC's minimum capacity. In step 610, controller measures and records the resulting $\Delta P_S$ in historical data 134, and ends in step 612. In this way, if there currently is an AVC, capacity is decreased by modulating AVC capacity, until AVC reaches its minimum capacity.

When there is currently no existing AVC, and when the current AVC is at minimum capacity, remaining compressor rack components are switched as fixed capacity components. Thus, in step 606, when AVC is at minimum capacity and in step 604 when there is currently no existing AVC, controller 130 proceeds to step 614.

In step 614, controller 130 sets neuron ENB inputs 210, 310. A neuron ENB input 210, 310 is set to "enable" when the corresponding component is available for cycling consistent with the current goal of decreasing system capacity. In step 616, controller 130 determines whether any neuron is enabled. When no neuron is enabled, control algorithm 600 ends in step 612. When a neuron is enabled in step 616, controller 130 proceeds to step 618 and calculates SC-NN neuron outputs. The calculation of neuron outputs is described above with respect to step 510 of FIG. 5 and with respect to FIG. 11 of U.S. patent application Ser. No. 11/732, 120, U.S. Pub. No. 2007/0240436, and the accompanying description therein.

In step 620, enabled SC-NN neurons are ranked based on neuron outputs 212, 312. In step 622, controller 130 determines whether there is a non-AVC component ranked. When there is currently an AVC, control algorithm 600 leaves the AVC activated, at minimum capacity, for as long as possible. In this way, in step 622 controller 130 determines whether there is a non-AVC component ranked and available for cycling. In step 624, controller 130 cycles the non-AVC component based on the ranking of SC-NN neurons. Controller 130 may cycle the highest ranked non-AVC component according to neuron outputs 212, 312. In step 610, controller 130 may measure and record resulting $\Delta P_S$ and end in step 612.

In step 622, when there is no non-AVC component ranked, controller 130 proceeds to step 626. At this point, the only component available for cycling is the AVC, which is currently at minimum capacity. Control algorithm 600 may decline to deactivate the AVC, however, to maintain maximum capacity flexibility. An exception, however is a pump-down condition. In a pump-down condition, when the AVC is the only activated component, and when the pump-down condition remains, controller 130 may deactivate the AVC. At this point, all compressors 102 may be deactivated and $P_S$ may begin to rise again. Thus, in step 626, controller 130 determines whether a pump-down condition exists. When in step 626 a pump-down condition exists, controller 130 may cycle the AVC in step 628 and measure and record resulting $\Delta P_S$ in step 610. When a pump-down condition does not exist in step 626, controller may leave the AVC activated. Control algorithm 600 may end in step 612.

With reference to FIG. 6B, another control algorithm 601 for decreasing or subtracting capacity with SC-NN may be executed by controller 130. The functionality described in FIG. 6B may correspond generally with the functionality encapsulated in step 410 of FIG. 4. Control algorithm 601 includes steps 602 to 624 that are also described above with reference to FIG. 6A. The description of steps 602 to 624 is not repeated here.

In control algorithm 601, when no non-AVC component is ranked in step 622, controller 130 may proceed to step 627 to determine whether a smaller variable capacity component, i.e., a variable capacity component having a capacity that is smaller than the capacity of the current AVC, is available. In this way, when the current AVC is at minimum capacity and a further decrease in capacity is required, controller 130 may determine that a smaller variable capacity component may be a preferred AVC. In this way, in step 627 when a smaller variable capacity component is available, controller 130 may switch the AVC to the smaller variable capacity component in step 629. This may include cycling the current AVC, cycling the smaller variable capacity component, and designating the smaller variable capacity component as the AVC. This may also include appropriately setting the capacity of the smaller variable capacity component. Controller 130 may then proceed to step 610 measure and record resulting $\Delta P_S$.

When in step 627 a smaller variable capacity component is not available, controller 130 may proceed to step 626 to determine whether a pump-down condition exists. When in step 626 a pump-down condition exists, controller 130 may cycle the AVC in step 628 and measure and record resulting $\Delta P_S$ in step 610.

In this way, when decreasing capacity, controller 130 may first deactivate all non-AVC components. When the AVC is the only remaining active component, controller 130 may switch the AVC to the smallest variable capacity component available. The smallest variable capacity component may remain active until a pump-down condition exists. When a pump-down conditions exists, controller may cycle the smallest variable capacity component. In this way, controller 130 may continue to maintain an AVC in operation until a pump-down condition is detected.

While FIGS. 6A and 6B show step 626 where controller 130 checks for a pump-down condition, it is understood that controller 130 may check for a pump-down condition at additional points in control algorithms 600 and 601. For example, controller 130 may make continually check for a pump-down condition and take appropriate action to rapidly decrease capacity of compressor rack 104 and multiple points in control algorithms 600 and 601.

As described above in step 516 of FIG. 5, when two variable capacity devices become active, controller 130 may determine whether the current AVC should be switched. To this end, a third neural network (in addition to the AC-NN and the SC-NN) may be used. The third neural network, i.e., the "check AVC neural network" or "C-AVC-NN" is comprised of neurons 700 shown in FIG. 7 corresponding to variable capacity components. For the enable (ENB) input 710 to be set to "enable," the corresponding variable capacity component must be activated.

Neuron 700 may have two inputs: an active range (AR) input 702 and a run-time (RT) input 704. AR input 702 may be based on the capacity range of the variable component. RT input 704 may be based on total run-time of the component.

With respect to AR input 702, variable capacity components may be assigned predetermined rankings based on their range such that variable capacity components with larger capacity ranges may score higher AR inputs 702. For example, AR input 702 may be calculated based on the following formula:

$$AR \text{ input}=0.5+0.5\times(\text{ranking}), \quad (1)$$

where the ranking is predetermined based on capacity range.

As an example, there may be three variable capacity components: A, B, and C. A may have twice the capacity range as B and B may have twice the capacity range as C. In such case, A may be assigned a ranking of 1, B may be assigned a ranking of 0.5, and C may be assigned a ranking of 0. In such case, AR input 702 for component A may be 1. AR input 702 for component B may be 0.75. AR input 702 for component C may be 0.5. In this way, if RT inputs 704 are equal, A will be a preferred AVC over B and C and B will be a preferred AVC over C.

RT input 704 may be weighted based on user preference and corresponds to the run-time of the corresponding variable capacity device. Using components A, B, and C as examples again, A may have twice the run-time of B and B may have twice the run-time of C. In such case, A may receive a ranking of 0, B may receive a ranking of 0.5, and C may receive a ranking of 1. These rankings may be multiplied by the predetermined user-defined weighting factor to arrive at the RT input 704 amount.

AR input 702 and RT input 704 may be added together to calculate neuron output 712. The neuron from the C-AVC-NN with the highest output 712 may be designated the AVC.

Figure 8:
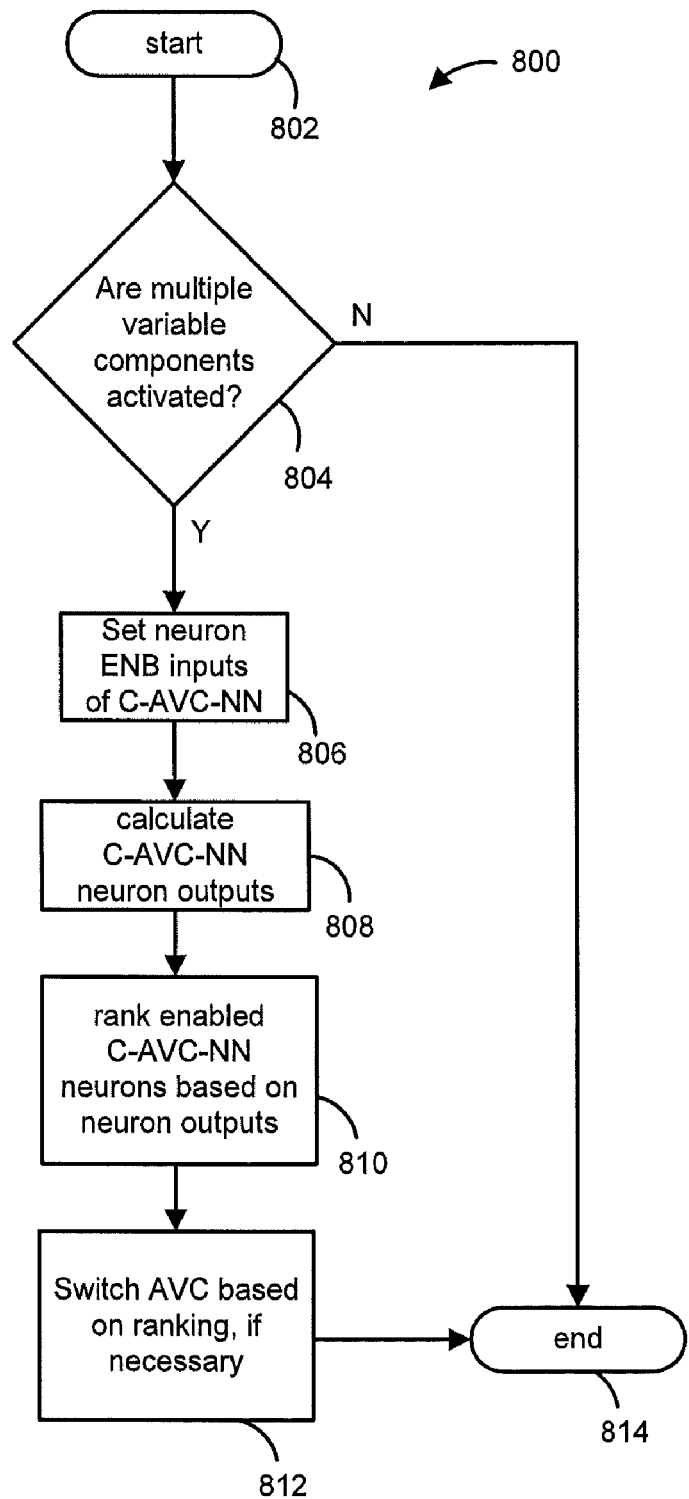
FIG. 8 is a diagram of a flowchart illustrating a refrigeration system component designation algorithm.

With reference to FIG. 8, a control algorithm 800 for performing a multiple variable component check with C-AVC-NN may be executed by controller 130. The functionality of FIG. 8 is encapsulated in step 516 of FIG. 5. Control algorithm 800 may start in step 802. In step 804, controller 130 may determine whether multiple variable components are activated. When multiple variable components are not activated, control algorithm 800 ends in step 814. When multiple variable components are activated, control algorithm proceeds to step 806. In step 806, controller sets neuron ENB inputs 710 according to whether a component corresponding to a particular neuron is activated. In step 808, controller may calculate neuron outputs 712 for each enabled neuron in C-AVC-NN. In step 810, controller 130 may rank enabled neurons based on neuron outputs 712. In step 812, controller may switch the designated AVC based on the ranking if necessary. If the neuron corresponding to the current AVC is the "winning" neuron, based on the ranking, then the AVC designation may not need to be switched. If the neuron corresponding to the current AVC is not the "winning" neuron, based on the ranking, then controller 130 may switch the AVC to the component corresponding to the "winning" neuron.

In this way, controller 130 may utilize three neural networks AC-NN, SC-NN, and C-AVC-NN to maintain accurate control over system capacity according to system load. By maintaining a single variable capacity component as the designated AVC, maximum capacity flexibility with minimum component switching is achieved. Further, unpredictable operation based on operating more than one component in a variable state is avoided and maximum efficiency is achieved.

What is claimed is:

1. A method of controlling a compressor rack having a plurality of variable capacity components comprising:

selecting a variable capacity component from said plurality of variable capacity components as a designated variable capacity component, a capacity of each variable capacity component being continuously variable within an associated variable capacity range;

operating said designated variable capacity component by varying said capacity of said designated variable capacity component;

operating each variable capacity component of said plurality of variable capacity components, except for said designated variable capacity component, at a fixed capacity corresponding to one of a maximum and a minimum capacity of said each variable capacity component.

2. The method of claim 1 further comprising determining a desired rate of change of a compressor rack operating parameter, wherein said selecting said variable capacity component includes comparing said desired rate of change with said associated variable capacity range for said each variable capacity component and selecting said variable capacity component having a largest variable capacity range, that meets said desired rate of change, as said designated variable capacity component.

3. The method of claim 1 further comprising determining a desired rate of change of a compressor rack operating parameter, wherein said selecting said variable capacity component includes comparing said desired rate of change with said associated variable capacity range for said each variable capacity component, ranking each variable capacity component that meets said desired rate of change, based on a predetermined preference for operating said each variable capacity component, and selecting said variable capacity component as said designated variable capacity component based on said ranking.

4. The method of claim 1 further comprising:
   determining a desired rate of change of a compressor rack operating parameter;
   varying said capacity of said designated variable capacity component to meet said desired rate of change while said desired rate of change is within said associated variable capacity range of said designated variable capacity component;
   cycling an additional component of said compressor rack when said designated variable capacity component is operating at a maximum or a minimum capacity and when said desired rate of change is not met.

5. The method of claim 1 further comprising selecting a different variable capacity component from said plurality of variable capacity components as said designated variable capacity component, when at least two variable capacity components are concurrently operating, based on comparing said associated variable capacity range of each of said at least two variable capacity components such that a larger variable capacity range is preferred over a smaller variable capacity range.

6. The method of claim 1 further comprising selecting a different variable capacity component from said plurality of variable capacity components as said designated variable capacity component, when at least two variable capacity components are concurrently operating, based on a run-time of each of said at least two variable capacity components, such that a shorter component run-time is preferred over a longer component run-time.

7. The method of claim 1 further comprising deactivating said designated variable capacity component after deactivating all other components of said compressor rack.

8. The method of claim 7 wherein said deactivating said designated variable capacity component occurs when a pump-down condition is detected.

9. The method of claim 1 further comprising determining whether a smaller variable capacity component is available and decreasing capacity of said compressor rack by switching said designated variable capacity component to said smaller variable capacity component after deactivating all other components of said compressor rack.

10. A system comprising:
    a controller for a compressor rack having a plurality of variable capacity components;
    a computer readable medium accessible to said controller and storing a neural network having a plurality of neurons, each neuron being associated with a corresponding variable capacity component and having a neuron output based at least in part on a predetermined preference for operating said corresponding variable capacity component;
    said controller being configured to reference said neural network and evaluate said neuron output for each neuron of said neural network, to select a variable capacity component as a designated variable capacity component based on said evaluating, to operate said designated variable capacity component by varying a capacity of said designated variable capacity component, and to operate each variable capacity component of said plurality of variable capacity components, except for said designated variable capacity component, at a fixed capacity corresponding to one of a maximum and a minimum capacity of said each variable capacity component.

11. The system of claim 10 wherein said neuron output is based at least in part on whether a desired rate of change of a compressor rack operating parameter is within a variable capacity range of said corresponding variable capacity component.

12. The system of claim 11 wherein said predetermined preference is determined based on a variable capacity range of said corresponding variable capacity component and said controller is configured to evaluate said neuron output for each neuron to select said variable capacity component having a largest variable capacity range, that meets said desired rate of change, as said designated variable capacity component.

13. The system of claim 10 wherein said controller is configured to determine a desired rate of change of a compressor rack operating parameter, to vary a capacity of said designated variable capacity component to meet said desired rate of change while said desired rate of change is within a variable capacity range of said designated variable capacity component, and to cycle an additional component of said compressor rack when said designated variable capacity component is operating at a maximum or a minimum capacity and when said desired rate of change is not met.

14. The system of claim 10 wherein said computer readable medium stores an additional neural network having a plurality of neurons, each neuron being associated with a corresponding variable capacity component and having a neuron output based at least in part on a run time of said corresponding variable capacity component such that a shorter component run-time is preferred over a longer component run-time, said controller being configured to evaluate said neuron output for each neuron of said additional network when at least two variable capacity components are concurrently operating and to select a different variable capacity component as said designated variable capacity component based on said evaluating.

15. The system of claim 10 wherein said computer readable medium stores an additional neural network having a plurality of neurons, each neuron being associated with a corresponding variable capacity component and having a neuron output based at least in part on a variable capacity range of said corresponding variable capacity component such that a larger variable capacity range is preferred over a smaller variable capacity range, said controller being configured to evaluate said neuron output for each neuron of said additional network when at least two variable capacity components are concurrently operating and to select a different variable capacity component as said designated variable capacity component based on said evaluating.

16. The system of claim 10 wherein said controller is configured to deactivate said designated variable capacity component after deactivating all other components of said compressor rack.

17. The system of claim 16 wherein said controller is configured to deactivate said designated variable capacity component when a pump-down condition is detected.

18. The system of claim 10 wherein said controller is configured to determine whether a smaller variable capacity component is available and to decrease capacity of said compressor rack by switching said designated variable capacity component to said smaller variable capacity component after deactivating all other components of said compressor rack.

* * * * *

UNITED STATES PATENT AND TRADEMARK OFFICE
CERTIFICATE OF CORRECTION

PATENT NO.        : 8,047,012 B2
APPLICATION NO.   : 12/125754
DATED             : November 1, 2011
INVENTOR(S)       : Daniel Landers et al.

It is certified that error appears in the above-identified patent and that said Letters Patent is hereby corrected as shown below:

| | |
|---|---|
| Column 12, Line 2 | After "$P_s$" insert --.--. |
| Column 12, Line 43 | "bypass" should be --bypassed--. |
| Column 13, Line 19 | After "$\Delta P_S$" insert --.--. |
| Column 15, Line 22 | "conditions" should be --condition--. |
| Column 15, Line 30 | After "may" delete "make". |

Signed and Sealed this
Fifth Day of February, 2013

Teresa Stanek Rea
*Acting Director of the United States Patent and Trademark Office*